United States Patent
Thomas et al.

(10) Patent No.: US 10,792,935 B2
(45) Date of Patent: Oct. 6, 2020

(54) TOP LINER FORMATION

(71) Applicant: Hewlett-Packard Development Company, L.P., Houston, TX (US)

(72) Inventors: Jake H Thomas, San Diego, CA (US); Jason Swei, San Diego, CA (US); Alan Jacques, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 391 days.

(21) Appl. No.: 15/665,242

(22) Filed: Jul. 31, 2017

(65) Prior Publication Data
US 2019/0030919 A1  Jan. 31, 2019

(51) Int. Cl.
| | | |
|---|---|---|
| *B41J 11/00* | (2006.01) | |
| *B31F 1/28* | (2006.01) | |
| *B41M 7/00* | (2006.01) | |
| *C09D 11/38* | (2014.01) | |
| *B41M 5/50* | (2006.01) | |
| *B41J 3/407* | (2006.01) | |
| *B41J 2/21* | (2006.01) | |
| *B41M 5/52* | (2006.01) | |
| *B41M 5/00* | (2006.01) | |

(52) U.S. Cl.
CPC ........... *B41J 11/0015* (2013.01); *B31F 1/285* (2013.01); *B31F 1/2872* (2013.01); *B41J 3/407* (2013.01); *B41M 5/502* (2013.01); *B41M 7/0027* (2013.01); *B41M 7/0045* (2013.01); *B41M 7/0054* (2013.01); *C09D 11/38* (2013.01); *B41J 2/2114* (2013.01); *B41M 5/0017* (2013.01); *B41M 5/5218* (2013.01); *B41M 7/009* (2013.01); *B41M 7/0018* (2013.01)

(58) Field of Classification Search
CPC .................................................. B41J 11/0015
USPC .......................................................... 101/488
See application file for complete search history.

(56) References Cited

U.S. PATENT DOCUMENTS

| | | | |
|---|---|---|---|
| 6,011,947 A * | 1/2000 | Acquaviva ............ | B05C 1/0834 399/341 |
| 6,376,024 B1 * | 4/2002 | Siler ....................... | B41F 23/02 101/487 |
| 8,321,921 B1 | 11/2012 | Ahmed et al. | |
| 8,398,802 B2 | 3/2013 | Kohler | |
| 8,708,479 B2 | 4/2014 | Link | |
| 9,328,258 B2 | 5/2016 | Zhou et al. | |
| 9,427,975 B2 | 8/2016 | Bugner et al. | |
| 2003/0029343 A1 * | 2/2003 | De Vroome ............ | B41F 23/02 101/487 |

(Continued)

OTHER PUBLICATIONS

"Smurfit Kappa and HP Team to Digitise Corrugated Post-print Production", PackagingNews (Jun. 10, 2016), Retrieved from the Internet on May 4, 2017, https://www.packagingnews.co.uk/news/materials/corrugated/smurfit-kappa-and-hp-team-to-digitise-corrugated-post-print-production-10-06-2016.

*Primary Examiner* — Anthony H Nguyen
(74) *Attorney, Agent, or Firm* — HP Inc. Patent Department

(57) ABSTRACT

In one example of the disclosure, a print agent is applied upon a length of web substrate. A dryer is utilized to dry the web substrate length. Moisture is applied to the web substrate length. The moisturized web substrate length is wound upon a spool to form a top liner length, with no dryer to be utilized to dry the web substrate length between the moisture application and the winding.

13 Claims, 7 Drawing Sheets

(56) References Cited

U.S. PATENT DOCUMENTS

| | | | | |
|---|---|---|---|---|
| 2010/0181015 A1* | 7/2010 | Kohler | ............. | B31F 1/2872 |
| | | | | 156/210 |
| 2012/0050433 A1* | 3/2012 | Fujikura | ............. | B41J 11/002 |
| | | | | 347/102 |
| 2013/0184135 A1 | 7/2013 | Duer | | |
| 2014/0078212 A1* | 3/2014 | Nakai | ............. | B41J 2/07 |
| | | | | 347/16 |
| 2015/0360480 A1* | 12/2015 | Bugner | ............. | B41M 7/00 |
| | | | | 347/21 |
| 2016/0167403 A1* | 6/2016 | Toya | ............. | F26B 17/284 |
| | | | | 347/102 |

* cited by examiner

TOP LINER FORMATION

BACKGROUND

A top liner is a layer of paper or other substrate that is to be adhered to a single face layer to form a corrugated material. A print system can be utilized to form a customized top liner by applying print agents to the substrate to produce an image on the substrate. In examples, a corrugation device may then be utilized to adhere the customized top layer and the single face layer to create a customized corrugation material.

DRAWINGS

DETAILED DESCRIPTION

Figure 1A:
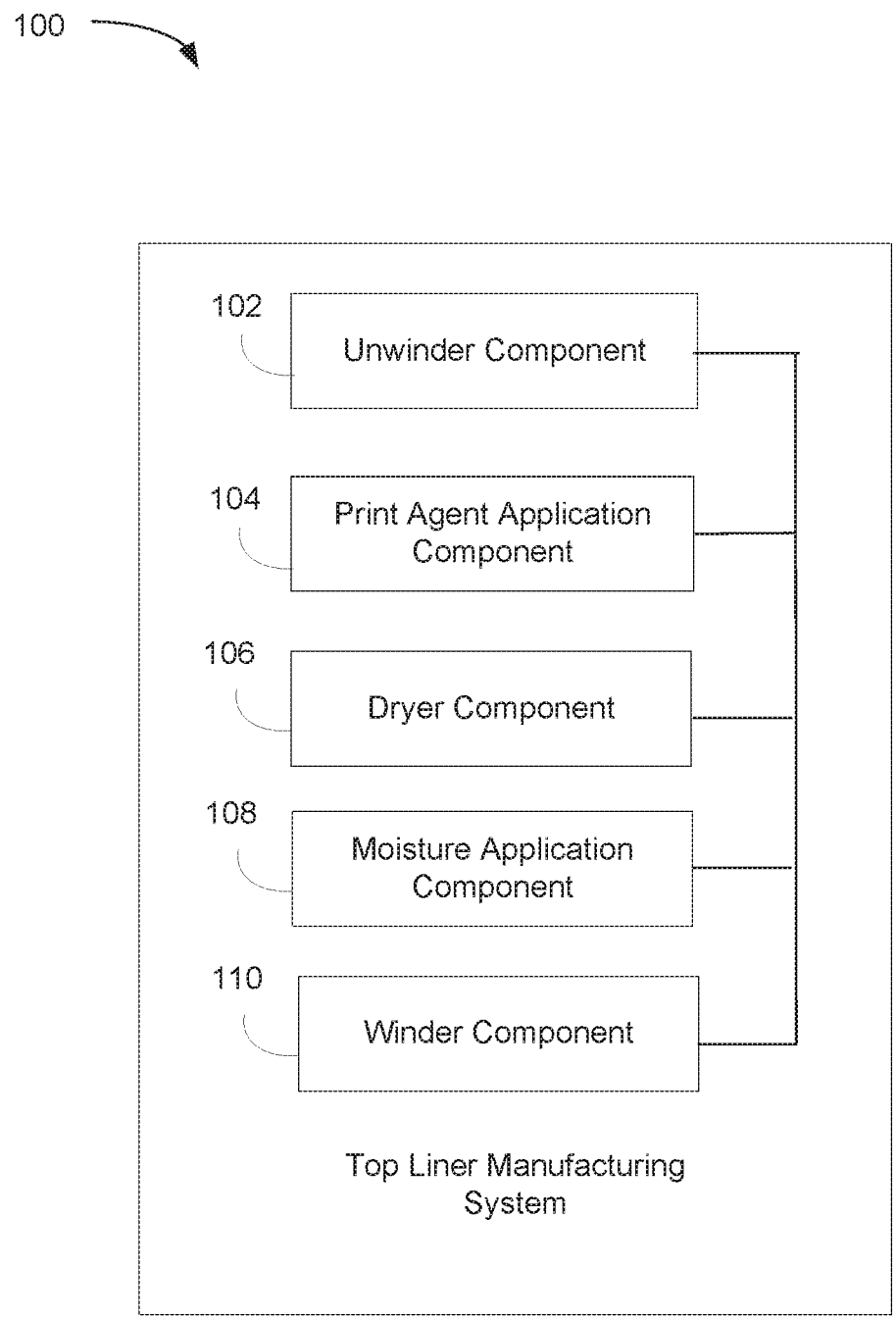
FIGS. 1A and 1B illustrate examples of a system for top liner formation.

In certain examples, the print system for forming a customized top liner may be a web-fed inkjet print system. In a web-fed inkjet print system a feeder component, e.g., a component including an unwinder spool and feeder rollers, may be utilized to feed a continuous web substrate to a print engine. The print engine may utilize an array of printheads to apply an ink film print agent to the web substrate.

To reduce costs associated with creating customized top liners and corrugated products, many customers choose to utilize media other than utilizing media specifically created for inkjet printing (referred to herein as an "inkjet-specific media"). For instance, customers may choose to utilize a media typically used in offset printing (referred to herein as an "offset print media") in conjunction with an inkjet-receptive prime coating and/or an overprint varnish. While such primer and overprint operations can lend the media beneficial surface properties, low porosity of the treated media can be a significant impediment to absorption of ink vehicle into the media. Heat, e.g., via a dryer, is often applied to reduce the high moisture content of the ink vehicle at the substrate surface. As moisture evaporates from the ink surface during drying, there may be a flux of ink vehicle towards the ink surface to replenish the evaporating moisture. This flux can carry cosolvents along with the moisture. In certain situations the moisture evaporates leaving a cosolvent-rich layer on the surface of the ink layer. After ink drying is complete, these ink cosolvents can concentrate at the surface and in turn interact with binders present in the primer, ink, and overprint varnish that is subsequently applied.

The ink and overprint varnish layers can thus become softened, such that the print layer will be damaged when the pre-printed top liner passes through a corrugation process. The presence of cosolvents at the surface of the ink layer reduce the glass transition temperature of polymers in the ink film and overprint layer. This reduced glass transition temperature, when combined with the high temperatures present in the corrugation process (350 F+) can result in print agent layer that is soft. As the top liner with the soft print agent film is moved across the hotplates of a corrugator device, the top liner can stick, bind, or otherwise fail in under shear stresses present during the corrugation process.

To address these issues, various examples described in more detail below provide a system and method that enables production of top liners with improved durability by application of moisture after a last drying operation of the printing process. In a particular example, a print agent is applied upon a length of a web substrate. A dryer is utilized to dry the web substrate length. Moisture is applied to the web substrate length, with no dryer to be utilized to dry the web substrate length after the moisture application. The moisturized web substrate length is then wound upon a winder spool to form a top liner length. In examples, these operations are performed for each of a set of connected lengths of a web substrate.

In examples, the applying of the print agent to the web substrate length includes an application of an ink film to the web substrate length utilizing a print engine. In other examples, applying of the print agent to the web substrate length further may also include applying a primer coat layer to the web substrate utilizing a primer coater apparatus. In yet other examples, the applying of the print agent to the web substrate length may also include applying an overprint coat layer to the web substrate utilizing an overprint coater apparatus.

In certain examples, the moisture may be applied by a mist application apparatus or a steam application apparatus. In examples, the moisture may be applied to the opposite side, or the same side, relative to the side of the media to which the print agent is applied. In yet another example, the moisture may be applied to both the side of the media to which the print agent is applied and to the opposite non-printed side.

In examples, the web substrate length may be unwound from a first spool with the web substrate length having a moisture content within a baseline range, wherein the formed top liner length wound upon the second spool has a moisture content within the baseline range.

In examples, the web substrate length may be moved through a web extender apparatus after application of moisture to the length and before the winding the web substrate length upon the spool to form the top liner length. Such moving of the web substrate length along the web extender apparatus is to allow time for absorption of the applied moisture.

In examples, each of a set of formed and connected top liner lengths are to be unwound from an unwinder spool, and fed to a corrugation component that is to adhere the top liner length to one or more single face lengths to form a corrugated length. As used herein, a "single face" refers generally to an outer liner substrate that is adhered or otherwise connected to a flute substrate. A "single face" is sometimes referred to as a "single face corrugated". In particular examples, there is to be a delay of at least sixty minutes as between formation of the top liner length and winding of the top liner length upon a winder spool and the corrugation process of adhering of a top liner length to a single face length to form the corrugated length.

In this manner users of the disclosed top liner formation system and method should appreciate the substantial improvements in print agent durability and quality of the post-corrugation product as compared to systems and methods that do not apply moisture after the last drying operation. Further, users of the disclosed top liner formation system and method should appreciate the substantial cost savings associated with the ability to use offset print media, as compared to existing systems and methods that can require inkjet-specific media. The disclosed remoisturization enables the use less expensive offset print media in a manner that gives the created top liner the durability needed to survive the downstream corrugation processes. Manufacturers and providers of print systems should likewise appreciate the competitive benefits of offering the top liner formation system and method described herein.

Figure 1B:
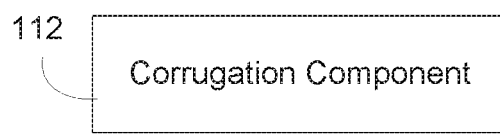

FIGS. 1A and 1B depict examples of top liner formation. In FIGS. 1A and 1B various components are identified as components 102, 104, 106, 108, 110, and 112. In describing components 102-112 focus is on each component's designated function. However, the term component, as used herein, refers generally to hardware and/or programming to perform a designated function. As is illustrated with respect to FIGS. 2A and 2B, the hardware of each component, for example, may include one or both of a processor and a memory, while the programming may be code stored on that memory and executable by the processor to perform the designated function.

FIG. 1A illustrates an example of a system 100 for top liner formation. In this example, system 100 includes an unwinder component 102, a print agent application component 104, a dryer component 106, a moisture application component 108, and a winder component 110. As illustrated in FIG. 1B, in certain examples system 100 for top liner formation may also include a corrugation component 112. In performing their respective functions, components 102-112 may access a data repository, e.g., a memory accessible to system 100 that can be used to store and retrieve data.

In the example of FIG. 1A, unwinder component 102 represents generally a combination of hardware and programming to cause an unwinding of a web substrate from an unwinder spool so as to cause lengths of the web substrate to move through a print zone such that a print engine can apply an ink film to the web substrate. As used herein, an "unwinder spool" refers generally to any reel or other device, cylindrical otherwise, upon which a web substrate has been wound. In a particular example, the web substrate may be a web of offset print media. As used herein a "length" of web substrate refers generally to a quantity or subset of the entirety of the web substrate. It is contemplated that the lengths described herein are contiguous or connected, together making up the whole of a web substrate that may be unwound from an unwinder spool and, after application of processes described herein, wound upon a winder spool.

Print agent application component 104 represents generally a combination of hardware and programming to, for each of a set of lengths of a web substrate, apply a print agent upon the web substrate length. As used herein, the term "print agent" refers generally to any material to any substance that can be applied upon a media by a printer during a printing operation, including but not limited to aqueous inks, solvent inks, UV-curable inks, dye sublimation inks, latex inks, liquid electro-photographic inks, liquid or solid toners, powders, primers, and overprint materials (such as a varnish). An "ink" refers generally to any fluid that is to be applied to a media during a printing operation to form an image upon the media.

In examples, the applying of the print agent to the web substrate length includes an application of an ink film to the web substrate length utilizing a print engine. As used herein a "print engine" refers to generally to a set of components that are utilized to apply ink to a substrate. In a particular example, the print engine may be an inkjet print engine that includes a print bar with a set or sets of thermal inkjet printheads. In another example, the print engine may be a piezo print engine that includes a print bar, or another set or sets, of piezo printheads. In another example, the print engine may be may be a dry toner laser printing engine, and the print agent application components may include a photoconductor, a dry toner cartridge, and/or a fuser element. In yet another example, the print engine may be may be a liquid electro-photographic ("LEP") print system, with print application components including a writing element, a photoconductor element, a charge element, an intermediate transfer member or blanket, and/or an impression drum.

In other examples, the applying of the print agent to the web substrate length may include utilizing a primer coater apparatus to apply a primer coat layer to the web substrate length. As used herein, a "primer" refers generally to any substance that is applied to the web substrate length as a preparatory coating in advance of application of ink to the web substrate length. In examples, the primer may be a water soluble polymer.

In other examples, the applying of the print agent to the web substrate length may include utilizing an overprint coater apparatus to apply an overprint coat layer to the web substrate length. As used herein, an "overprint coat layer" refers generally to any substance that is applied to the web substrate length as a protective or embellishment coating after the print engine has applied the ink film to the web substrate length. In examples the overprint coat layer may be an ultraviolet ("UV") coating that is applied to the web substrate and then cured utilizing an ultraviolet light. In other examples, the overprint coat layer may be an aqueous clear varnish applied without a UV curing process.

Dryer component 106 represents generally a combination of hardware and programming to, for each of the set of lengths of the web substrate, cause a dryer to dry the web substrate length. As used herein, "dryer" refers generally to any apparatus that is to reduce moisture in a subject material, such as a web substrate length, or an ink film that has been applied by a print engine upon a web substrate length. In an example, the dryer may be an infrared heating dryer. In another example, the dryer may by a device that dries a target by applying a forced air stream upon the target. In examples, a dryer may be an intrastation dryer (a dryer situated between print engines). In another example, the dryer may be a tunnel dryer or overhead dryer situated adjacent to the web substrate, but previous to a moisture application component, in relationship to a direction the media travels during a print operation.

Moisture application component 108 represents generally a combination of hardware and programming to, for each of the plurality of lengths of the web substrate, apply moisture to the web substrate length. In one example, the moisture to be applied is water with no additives. In other examples, the moisture to be applied is a water-based composition with additives such as surfactants.

In examples moisture application component 108 may apply the moisture to the lengths of web substrate a mist, utilizing a mist application apparatus. In other examples moisture application component 108 may apply the moisture to the lengths of web substrate as steam utilizing a steam application apparatus. In yet other examples moisture application component 108 may apply the moisture to the lengths of web substrate as steam by guiding the web substrate lengths through a high humidity environment. As used herein, a "high humidity environment" refers generally to an environment with a relative humidity above fifty percent.

In a particular example, print agent application component 104 may apply the print agent (e.g. the ink layer) to a first side of each web substrate length, and moisture application component 108 is to apply the moisture a second side of the web substrate length that is opposite the first side. When moisture is applied to the back (non-ink) side of a web substrate length, the moisture content of the media remains elevated as the paper is rewound into the roll, allowing for greater diffusive mobility of the water-soluble ink cosolvents. In another particular example, print agent application component 104 may apply the print agent (e.g. the ink layer) to a first side of each web substrate length, and moisture application component 108 is to apply the moisture the same first side of the web substrate. When moisture is applied to an ink-side of a web substrate length, the moisture dissolves ink cosolvents and carries the ink cosolvents into the web substrate lengths via capillary effects. In another particular example, print agent application component 104 may apply the print agent (e.g. the ink layer) to a first side of each web substrate length, and moisture application component 108 is to apply the moisture the both the first side of the web substrate that has been printed upon, and a second side of the media that is opposite the first side.

Winder component 110 represents generally a combination of hardware and programming to, for each of the set of lengths of the web substrate, wind the moisturized web substrate length upon a winder spool to form a top liner length. Once the moisturized web substrate lengths are rewound with elevated moisture content, the moisture becomes trapped within the roll of paper wound upon the winder spool. The residual heat carried into the winder spool of web substrate from the dryers associated with the primer, print engine, and overprinting processes is also trapped in the winder spool of web substrate.

The winder spool of formed top liner slowly cools to ambient temperature over a period of several hours. During this period of elevated temperature and moisture, diffusion of ink cosolvents is promoted within the top liner as moisture content and increased Brownian motion both act as a mobilizing agent to ink cosolvents within the top liner. In a particular example, the formed top liner length wound upon the winder spool will have a moisture content that is within a baseline range that is the same as the baseline range for moisture content of the web substrate as the web substrate was unwound unwound from the unwinder spool.

In this example, the processes described above are to occur and cause diffusion of cosolvents with no dryer being utilized to dry the web substrate length between the moisture application component 108 applying the moisture to the lengths of web substrate and the winding component winding the moisturized web substrate lengths upon a winder spool to form top liner lengths.

In certain examples, winder component 110 may include a web extender apparatus. In a particular example, the web extension apparatus is an apparatus that includes a series of rollers situated such that the web substrate is extended vertically in successive loops (e.g., in the shape of a festoon) so as to increase a distance between the last dryer of system 100 and the rewinder roll without dramatically increasing the horizontal footprint of the top liner manufacturing system. In these examples winder component 110 may, for each of the plurality of lengths of the web substrate, move the web substrate length through the web extender apparatus after application of moisture to the length and before winding the web substrate length upon the winder spool to form the top liner length. The moving of the web substrate length along the web extender apparatus is to allow additional time for absorption of the applied moisture, relative to a similarly situated system without the web extender apparatus.

Moving to FIG. 1B, in some examples system 100 may include a corrugation component 112. Corrugation component 112 represents generally a combination of hardware and programming to, for each of a plurality of formed and connected top liner lengths, unwind the top liner length from the unwinder spool and adhere the top liner length to a single face length to form a corrugated length. In certain examples, to maximize diffusion of the applied moisture there is to be a delay of at least sixty minutes as between the winder component 110 causing winding of a top liner length upon the winder spool and the corrugation component 112 being utilized to adhere the top liner length to a single face length to form the corrugated length. The moisture-facilitated diffusion has been shown to have beneficial effects on hot corrugation durability within sixty minutes under particular moisture and temperature conditions. For other moisture and temperature conditions the diffusion time may be extended so as to ensure ink layer durability during corrugation processes.

In the foregoing discussion of FIGS. 1A and 1B, components 102-112 were described as combinations of hardware and programming. Components 102-112 may be implemented in a number of fashions. Looking at FIG. 2 the programming may be processor executable instructions stored on a tangible memory resource 230 and the hardware may include a processing resource 240 for executing those instructions. Thus memory resource 230 can be said to store program instructions that when executed by processing resource 240 implement system 100 of FIGS. 1A and 1B.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the relevant instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may be separate but accessible to that device and processing resource 240.

In one example, the program instructions can be part of an installation package that when installed can be executed by processing resource 240 to implement system 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

Figure 2A:
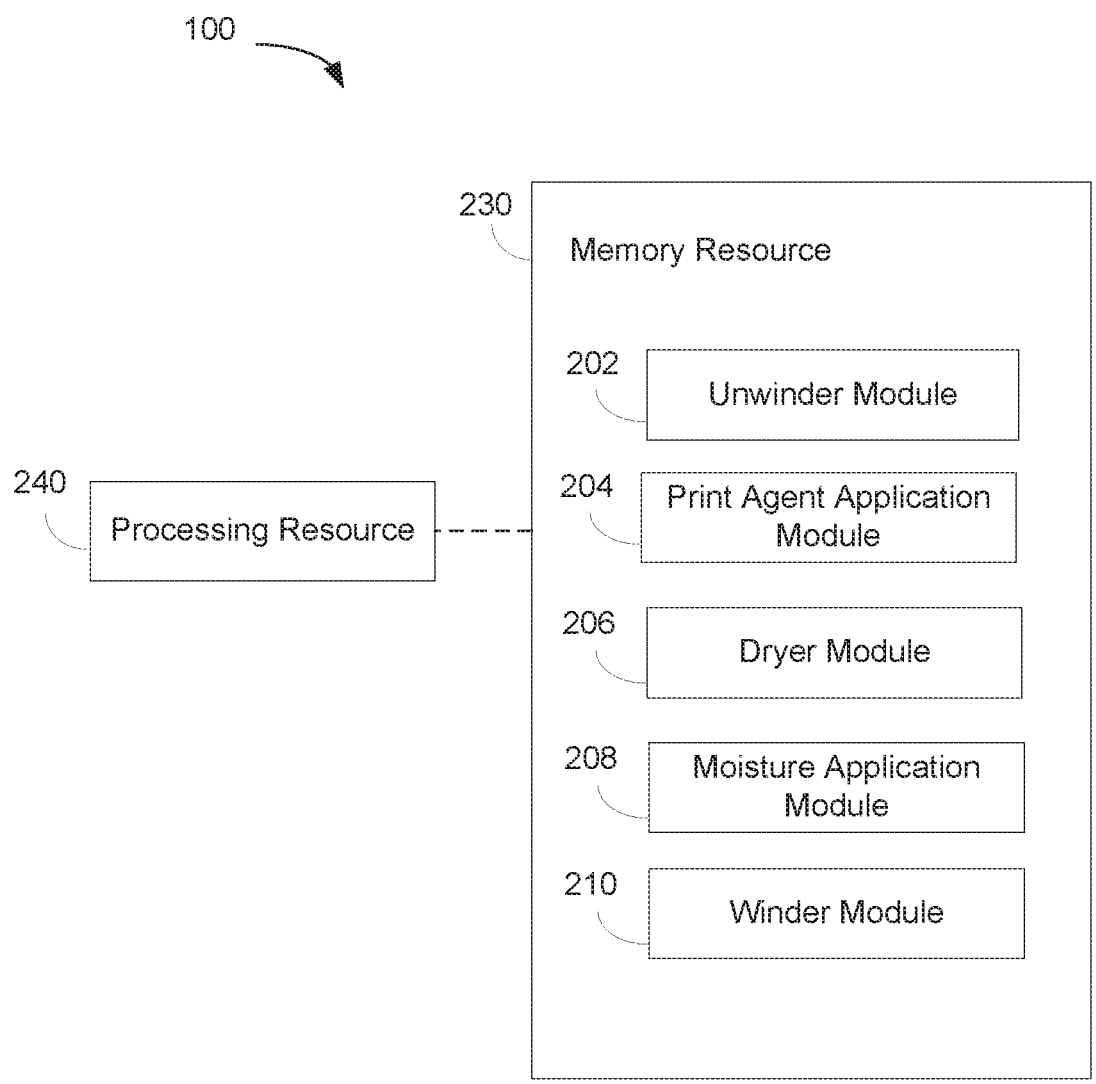
FIGS. 2A and 2B are block diagrams depicting a memory resource and a processing resource to implement an example of a method of top liner formation.
Figure 2B:
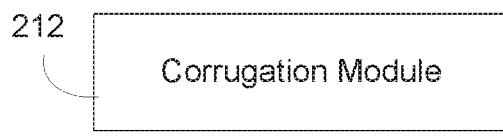

In FIG. 2A, the executable program instructions stored in memory resource 230 are depicted as unwinder module 202, print agent application module 204, and dryer module 206. Unwinder module 202 represents program instructions that when executed by processing resource 240 may perform any of the functionalities described above in relation to unwinder component 102 of FIG. 1A. Print agent application module 204 represents program instructions that when executed by processing resource 240 may perform any of the functionalities described above in relation to print agent application component 104 of FIG. 1A. Dryer module 206 represents program instructions that when executed by processing resource 240 may perform any of the functionalities described above in relation to dryer component 106 of FIG. 1A. Moisture application module 208 represents program instructions that when executed by processing resource 240 may perform any of the functionalities described above in relation to moisture application component 108 of FIG. 1A. Winder module 210 represents program instructions that when executed by processing resource 240 may perform any of the functionalities described above in relation to winder component 110 of FIG. 1A. Moving to FIG. 2B, in certain examples the executable program instructions stored in memory resource 230 may also include corrugation module 212. Corrugation module 212 represents program instructions that when executed by processing resource 240 may perform any of the functionalities described above in relation to corrugation component 112 of FIG. 1A.

Figure 3A:
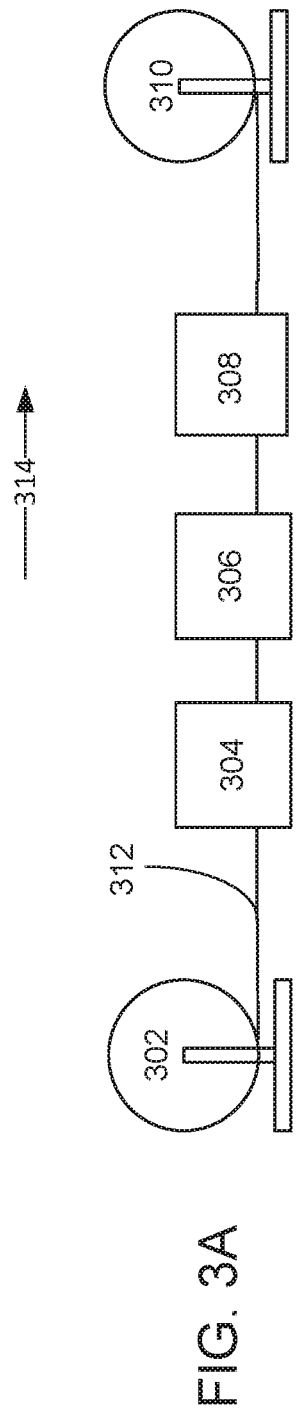
FIGS. 3A and 3B illustrate an example of a top liner manufacturing system.
Figure 3B:
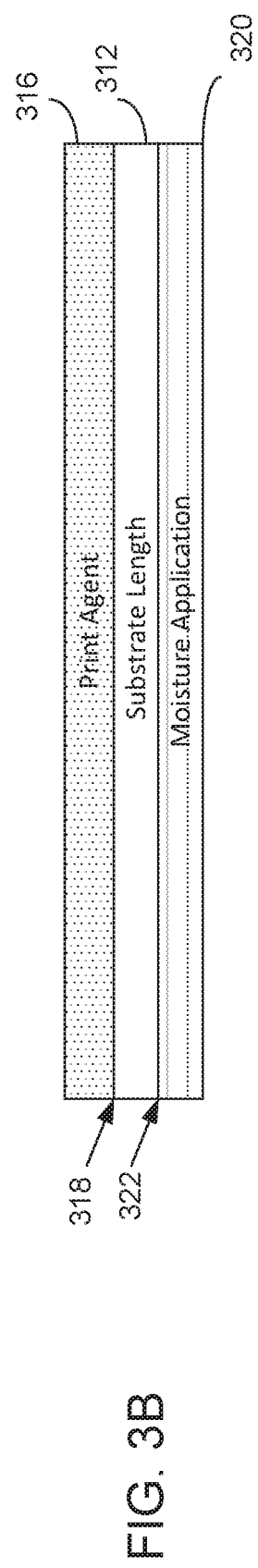

FIGS. 3A and 3B illustrate an example of top liner manufacturing system 100. Starting at FIG. 3A, in this example top liner manufacturing system 100 causes an unwinding of multiple connected lengths of web substrate 312 from an unwinder spool 302. Moving to FIG. 3B in view of FIG. 3A, for each length of web substrate 312, system 100 agent causes application of a print agent 316 upon a first side 318 of the web substrate length 312. In a particular example system 100 may cause a print engine 304 to apply a print agent that is an ink film upon the web substrate length 312. In examples, print engine 304 may be a print engine with thermal inkjet printheads. In other examples, print engine 304 may be a print engine with piezo printheads, may be a dry toner laser print engine, or may be a LEP print engine.

System 100 utilizes a dryer component 306 to dry each of the web substrate lengths. In examples, the dryer component 306 may be a distinct drying device that is after print engine 304 and before a moisture application component 308 relative to a web substrate direction 314 during printing. In another example, dryer 306 may incorporated into print engine 304. In another example, dryer 306 may be situated within or following a primer coater apparatus that precedes the print engine relative to the web substrate direction 314. In yet another example, dryer 306 may be situated within or following an overprint coating apparatus that is situated following the print engine relative to the web substrate direction 314. In other examples, multiple dryers may be utilized.

System 100 causes a moisture application component 308 to apply moisture 320 to each of the lengths of the web substrate length. The moisture application 320 is to occur, for each lengths of web substrate 312, after a last drying operation. In the example of FIG. 3A where there is a single dryer 306, system 100 will cause the application of moisture 320, for each of the web substrate lengths, after the drying process is performed by dryer 306 for that web substrate length. In cases where system 100 has multiple dryers (e.g., dryers associated with print engine 304 and also with a primer coater apparatus and/or over print coating apparatus, for each length of web substrate system 100 will cause moisture application component 308 to apply moisture 320 to the substrate length after the last drying operation to occur relative to the web substrate direction 314. In this example, system 100 has caused moisture application component 308 to apply the moisture 320 to a second side 322 of substrate length 312 that is opposite of the first side 318 upon which the print agent 316 was applied.

For each of the lengths of web substrate, after the application of moisture 320 to the web substrate length system 100 causes a winding the moisturized web substrate length upon a winder spool 310 to form a collection of connected top liner lengths. In an example, the winder spool of collected lengths of top liner will cool to an ambient temperature over a period of several hours. During this period of elevated temperature and moisture, diffusion of print agent (e.g., ink) cosolvents is promoted and durability of the printed upon top liner is enhanced such that the damage to the top liner during corrugation processes are reduced or eliminated.

Figure 4A:
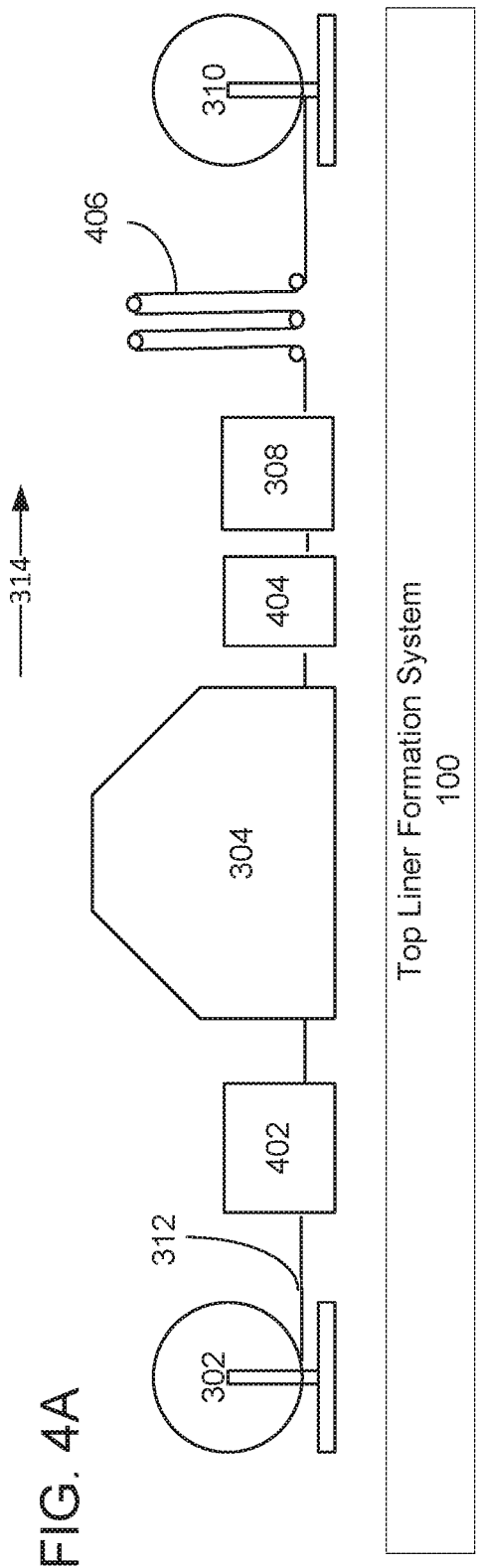
FIGS. 4A and 4B illustrate another example top liner manufacturing system that is to apply multiple print agents and utilizes a web extender apparatus.
Figure 4B:
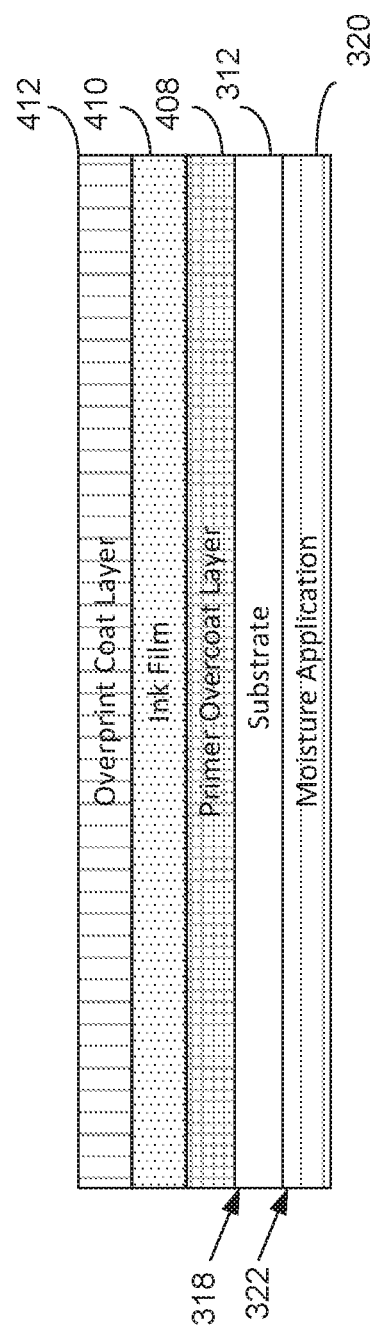

FIGS. 4A and 4B illustrate another example top liner manufacturing system that is to apply multiple print agents and that utilizes a web extender apparatus. Starting at FIG. 4A, in this example top liner manufacturing system 100 causes an unwinding of multiple connected lengths of web substrate 312 from an unwinder spool 302. Moving to FIG. 4B in view of FIG. 4A, for each length of web substrate 312, system 100 agent causes a primer coat apparatus 402 to apply a print agent that is a primer coat layer 408 upon a first side 318 of the web substrate length 312. For each length of web substrate 312, system 100 causes a print engine 304 with thermal inkjet printheads to apply a print agent that is an ink film 410 to the web substrate length 312, over the primer coat layer 408. For each length of web substrate 312, system 100 causes an overprint coater apparatus 404 to apply a print agent that is an overprint coat layer 412 to the web substrate length 312, over the ink film layer 410 and the primer coat layer 408 underlying the ink film layer 410.

System 100 utilizes one or more dryer components to dry each of the web substrate lengths. In an example, the dryer may be included as a component of print engine 304. In another example, the dryer 306 may be included as a component of primer coater apparatus 402 that precedes the print engine 304 relative to the web substrate direction 314. In yet another example, the dryer may be included as a component of overprint coating apparatus 404 that is situated following the print engine 404 relative to the web substrate direction 314. In examples, multiple dryers, e.g., a dryer at one or more of primer coat apparatus 403, print engine 304, and overprint coater apparatus 404 may be utilized.

System 100 causes a moisture application component 308 to apply moisture 320 to each of the lengths of the web substrate length. The moisture application 320 is to occur, for each lengths of web substrate 312, after the last drying operation. In this example, no drying apparatus is to be used to apply heat or forced air to the lengths of substrate operations are to take place between the time that moisture application component 308 applies moisture to a length of substrate, and the time that the formed top liner length is to be fed to a corrugation component for adhering to a single face length to form a corrugated product. In this example, system 100 has caused moisture application component 308 to apply the moisture 320 to a second side 322 of substrate length 312 that is opposite of the first side 318 upon which the print agent 316 was applied. In other examples, moisture application component 308 may apply moisture to the first side 318 of the web substrate 312, or to both the first 312 and second 322 sides of the web substrate.

System 100 causes, for each of the plurality of lengths of the web substrate, the web substrate length to move through a web extender apparatus 406 after the moisture application component 308 has applied moisture to the length and before winding of the web substrate length upon the winder spool 310 to form the top liner length. The moving of the web substrate length through the web extender 406 is to provide additional time for the web substrates to absorb the applied moisture relative to a top liner formation system without the web extender component.

For each of the lengths of web substrate, after the application of moisture 320 to the web substrate length and traversal through web extender apparatus 406, system 100 causes a winding the moisturized web substrate length upon a winder spool 310 to form a collection of connected top liner lengths. After a sufficient time period has elapsed to allow the collected lengths of top liner will cool to an ambient temperature, resulting in diffusion of print agent cosolvents, the top liner lengths can be sent to a corrugation component. The corrugation component will cause each of the top liner lengths to be combined (e.g., utilizing one or more of heat, pressure, and adhesive) with a length of single face material to form a corrugated product.

Figure 5:
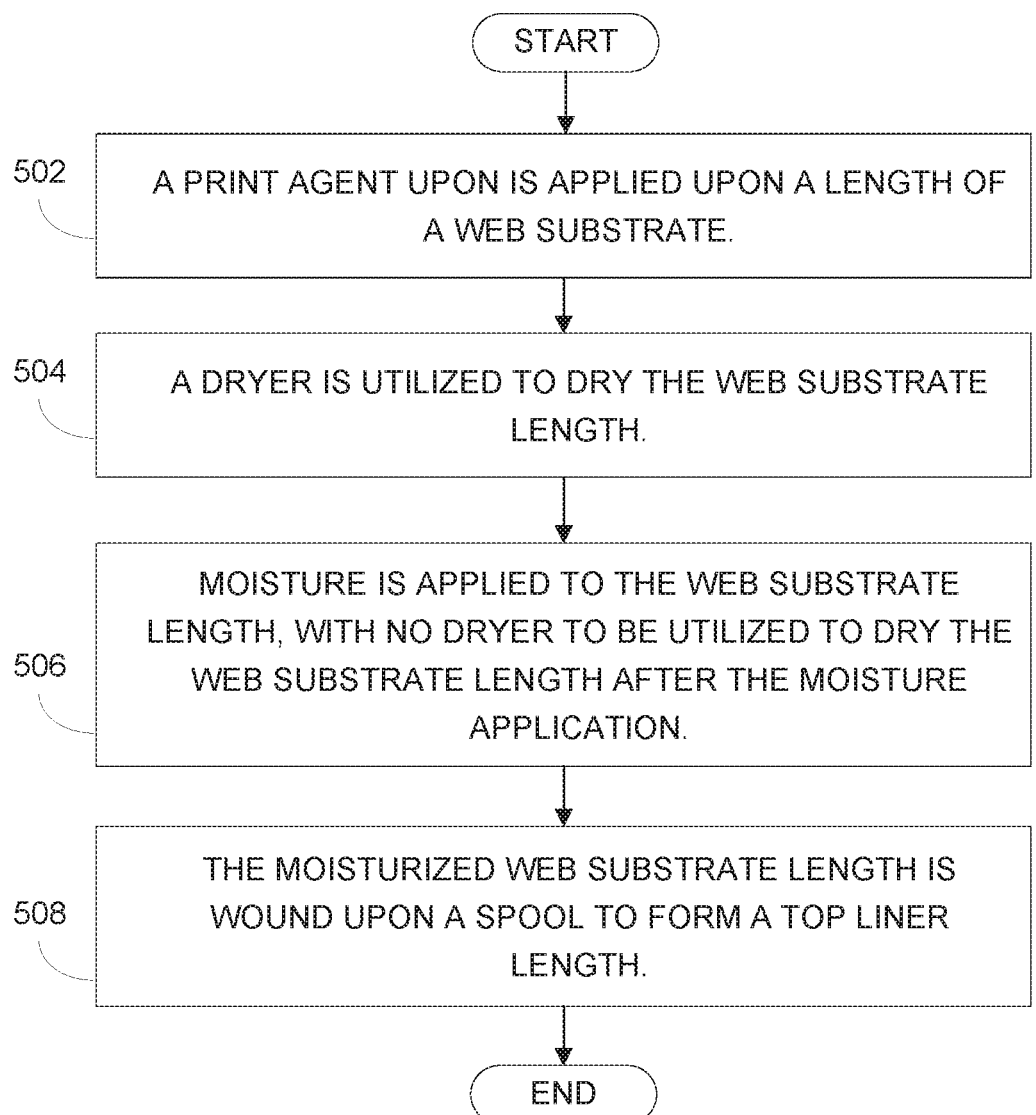
FIG. 5 is a flow diagram depicting implementation of an example of a method of top liner formation.

FIG. 5 is a flow diagram of implementation of a method for top liner formation. In discussing FIG. 5, reference may be made to the components depicted in FIGS. 1A and 2A. Such reference is made to provide contextual examples and not to limit the manner in which the method depicted by FIG. 5 may be implemented. A print agent upon is applied upon a length of a web substrate (block 502). Referring back to FIGS. 1A and 2A, print agent application component 104 (FIG. 1A) or print agent application module 204 (FIG. 2A), when executed by processing resource 240, may be responsible for implementing block 502.

A dryer is utilized to dry the web substrate length (block 504). Referring back to FIGS. 1A and 2A, dryer component 106104 (FIG. 1A) or dryer module 206 (FIG. 2A), when executed by processing resource 240, may be responsible for implementing block 504.

Moisture is applied to the web substrate length, with no dryer to be utilized to dry the web substrate length after the moisture application (block 506). Referring back to FIGS. 1A and 2A, moisture application component 108 (FIG. 1A) or moisture application module 208 (FIG. 2A), when executed by processing resource 240, may be responsible for implementing block 506.

The moisturized web substrate length is wound upon a spool to form a top liner length (block 508). Referring back to FIGS. 1A and 2A, winder component 110 (FIG. 1A) or winder module 210 (FIG. 2A), when executed by processing resource 240, may be responsible for implementing block 508.

FIGS. 1A, 1B, 2A, 2B, 3A, 3B, 4A, 4B, and 5 aid in depicting the architecture, functionality, and operation of various examples. In particular, FIGS. 1A, 1B, 2A, and 2B depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagram of FIG. 5 shows specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A top liner formation method, comprising:
for each of a plurality of lengths of a web substrate,
applying a print agent upon a first side of a length of the plurality of lengths of the web substrate without applying the print agent upon a second side of the length of the web substrate;
utilizing a dryer to dry the applied print agent and the length of the web substrate;
applying moisture to the length of the web substrate, with no dryer to be utilized to dry the web substrate length after the application of the moisture;
moving the length of the web substrate through a web extender after application of moisture to the length of the web substrate, the web extender including rollers that are not cooled by a cooling apparatus; and
winding the moisturized length of the web substrate upon a spool to form a top liner length following movement of the length of the web substrate through the web extender to allow time for absorption of the applied moisture.

2. The method of claim 1, wherein moisture is applied to a second side of the length of the web substrate, the second side being on a side opposite the first side.

3. The method of claim 1, wherein there is a delay of at least sixty minutes as between the winding of a top liner length upon the spool and adhering of a top liner length to a single face length to form a corrugated length.

4. The method of claim 1, wherein the applying of the print agent to the length of the web substrate includes applying an ink film to the length of the web substrate utilizing a print engine.

5. The method of claim 4, wherein the applying of the print agent to the length of the web substrate includes applying a primer coat layer utilizing a primer coater apparatus.

6. The method of claim 4, wherein the applying of the print agent to the length of the web substrate includes applying an overprint coat layer utilizing an overprint coater apparatus.

7. The method of claim 1, wherein the length of the web substrate is unwound from a first spool with the length of the web substrate having a moisture content within a baseline range, and wherein the formed top liner length wound upon the second spool has a moisture content within the baseline range.

8. The method of claim 1, wherein the web substrate is an offset print media, and wherein the applying of the print agent includes applying a primer coat layer and/or an overprint coat layer to the web substrate.

9. A system for top liner manufacturing, comprising:
an unwinder component to unwind a length of web substrate from a first spool;
a print agent application component to apply an ink film to a first side of a length of the web substrate length utilizing a print engine without applying an ink film on a second side of the length of the web substrate;
a dryer component to dry the applied ink film and the length of the web substrate;
a moisture application component to apply moisture to a second side of the length of the web substrate following operation of the dryer component;
a web extender including rollers that are not cooled by a cooling apparatus, wherein the length of the web substrate is to be moved through the web extender after application of moisture to the length of the web substrate; and
a winder component to wind the moisturized length of the web substrate upon a spool to form a top liner length following movement of the length of the web substrate through the web extender, wherein no dryer is to be utilized to dry the length of the web substrate between the moisture application and the winding.

10. The system of claim 9, further comprising a mist application apparatus to apply moisture to the length of the web substrate.

11. The system of claim 9, further comprising a steam application apparatus to apply moisture to the length of the web substrate.

12. The system of claim 9, wherein the length of the web substrate is unwound from a first spool with the length of the web substrate having a moisture content within a baseline range, and wherein the formed top liner length wound upon the spool has a moisture content within the baseline range.

13. The system of claim 9, further comprising a corrugation component to, for each of a plurality of formed and connected top liner lengths,
unwind the top liner length from the spool; and
adhere the top liner length to a single face length to form a corrugated length.

* * * * *